United States Patent [19]

Hijikata et al.

[11] 4,336,081

[45] Jun. 22, 1982

[54] PROCESS OF PREPARING STEEL COIL SPRING

[75] Inventors: Toshio Hijikata, Fujisawa; Kazuhiro Kawasaki, Hiratsuka, both of Japan

[73] Assignee: Neturen Company, Ltd., Tokyo, Japan

[21] Appl. No.: 224,625

[22] Filed: Jan. 12, 1981

Related U.S. Application Data

[62] Division of Ser. No. 34,951, Apr. 30, 1979, abandoned.

[30] Foreign Application Priority Data

| Apr. 28, 1978 | [JP] | Japan | 53-49930 |
| Jun. 23, 1978 | [JP] | Japan | 53-75445 |
| Jun. 23, 1978 | [JP] | Japan | 53-75446 |
| Aug. 25, 1978 | [JP] | Japan | 53-102752 |
| Aug. 25, 1978 | [JP] | Japan | 53-102753 |

[51] Int. Cl.$^3$ .................... C21D 8/06; C21D 9/02
[52] U.S. Cl. .................... 148/12 B; 148/12.3; 148/150
[58] Field of Search ............... 148/12 B, 12.3, 12.4, 148/142, 150, 11.5 R, 12 R, 154, 156

[56] References Cited

U.S. PATENT DOCUMENTS

| 3,271,206 | 9/1966 | Goda et al. | 148/154 |
| 3,589,950 | 6/1971 | Justusson | 148/12 B |
| 3,647,571 | 3/1972 | Okamoto et al. | 148/156 X |
| 3,795,550 | 3/1974 | Ettenreich et al. | 148/150 |
| 3,847,678 | 11/1974 | Furr | 148/12 B |
| 3,904,446 | 9/1975 | Uchida et al. | 148/12.3 |
| 3,929,524 | 12/1975 | Filatov et al. | 148/150 |
| 3,936,324 | 2/1976 | Uchida et al. | 148/12.3 |
| 4,050,959 | 9/1977 | Nakaoka | 148/12.3 |

*Primary Examiner*—Peter K. Skiff
*Attorney, Agent, or Firm*—Wenderoth, Lind & Ponack

[57] ABSTRACT

High-strength, high-workability steel for cold plastic working, obtained by subjecting a hardenable carbon steel to rapid high-frequency induction heating, quenching it, rapidly heating it by high-frequency induction to a temperature of 300°–600° C., and rapidly cooling it. This steel can be cold plastic worked, and then reheated at 300°–500° C. for 30–60 minutes, to obtain a steel having a high elastic limit.

7 Claims, 6 Drawing Figures

PROCESS OF PREPARING STEEL COIL SPRING

This is a division of application Ser. No. 34,951, filed Apr. 30, 1979, now abandoned.

BACKGROUND OF THE INVENTION

The conventional practice of plastic working a steel is broadly classified into cold working and hot working. Cold working is mainly applied to the manufacture of a small diameter or thin-walled product, while hot working is mainly applied to the manufacture of a large diameter or thick-walled product. As the strength of a steel with a large diameter or thick wall becomes greater, its working becomes more difficult.

Thus, for example, a conventional coil spring of more than 10 mm in diameter is manufactured by hot working a steel into the form of a coil spring and then quenching and tempering it to impart high strength to the spring.

Hot working is a method of easily forming a coil spring, but it has various drawbacks. The spring surface is liable to be broken because of hot working under lowered strength of the material at high temperature, and decarburization is liable to occur with heating to the austenitizing temperature. Furthermore, strength variance is liable to occur because of the heat treatment applied to the spring in the form of a coil, and heat treatment also causes a coarse surface or deformation, yielding a finished product which is more liable to be defective than a cold worked product.

Cold working of a coil spring from a relatively small diameter, for example, oil-tempered wire with a required strength, in which the wire is not heated for working, retains the strength of the wire and causes no coarse surface. In this respect, cold working may be said to be superior to hot working, but the trouble is that, when the wire has a high strength, its working becomes harder as its diameter increases.

SUMMARY OF THE INVENTION

With the above discussion in mind, the first object of the present invention is to provide a high-strength, high-workability steel which can be easily cold plastic worked by an ordinary working machine, even if the material has a large diameter or thick wall. This object can be achieved by rapidly high-frequency induction-heating a hardenable carbon steel containing an adequate content of more than one element from among Mn, Cr, Si, Mo, and, if desired, also containing other elements, quenching the steel, then rapidly heating it to a desired temperature between 300° and 600° C., and rapidly cooling it immediately after this desired temperature is reached or after holding it for a short time at said temperature.

The second object of the present invention is to provide a finished product of a remarkably enhanced elastic limit. This object can be accomplished by subjecting the cold plastic workable steel, obtained as described above, to cold plastic working, followed by 30–60 minutes of low-temperature tempering at 300°–500° C. for stabilizing the steel.

DETAILED DESCRIPTION OF THE INVENTION

Figure 1A:
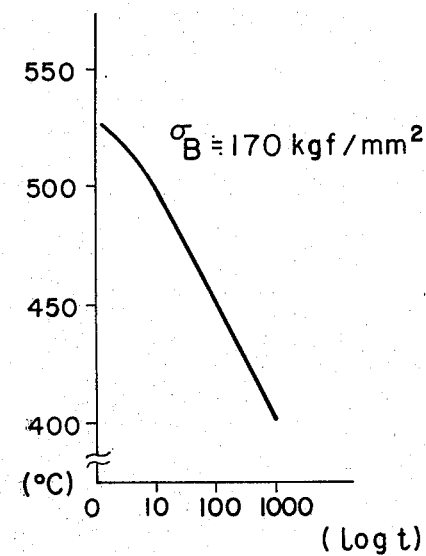
FIGS. 1(a) and 1(b) each show the relationship between tempering temperature and tempering time over a temperature range which gives a certain tensile strength to a test specimen which has been subjected to tempering and then cooling in accordance with an experiment to be described later. In these figures, the ordinate is the tempering temperature and the abscissa is the tempering time (logarithm log t).

According to the present invention, high strength and high workability are imparted to a starting material steel in a first heat treatment stage preceding cold plastic working, and, following cold plastic working, a high elastic limit is imparted to the resultant product in a second heat treatment stage. Therefore, it is essential that the starting material steel be significantly hardenable, and for this purpose, it is desirable that the starting material steel to be used in the present invention is a carbon steel with a carbon content of more than 0.3% by weight, and also containing Si and Mn, which is an art-recognized typical hardenable steel. The hardenable steel is, however, not limited to such steels. As illustrated later, carbon steels containing 0.3% or less by weight of carbon and an adequate content of more than one element from among Mn, Cr, Si and Mo are sufficiently hardenable, and any of them can be used as the starting material steel in this invention.

For example, a steel containing appropriate amounts, by weight, within the ranges of 0.1–1.1% C, 0.3–2.0% Mn and 0.15–2.5% Si is a well-known hardenable steel, and can be used as the starting material steel in the present invention. When, for example, the amount of carbon in this steel is 0.3% by weight or less, Cr and/or Mo can be added to the steel.

Furthermore, if desired, other elements, such as V, B and Nb, may be added to the starting material steel.

In the manufacture of a cold plastic workable steel, which is the first object of the present invention, and results in an intermediate product, the starting material steel is rapidly heated by high-frequency induction heating. The temperature reached during this heating step is within the range from just above the $A_3$ temperature to a maximum of about 1100° C., and heating to a temperature within this range is carried out at a rate of greater than 100° C./second, and at a frequency (high-frequency induction heating) of greater than 10 KHz. The steel is held in the austenitic range of less than 1000° C. for the shortest time, depending on the composition of the starting material steel, which will be effective to austenitize the steel structure and thus produce, upon quenching, fine austenite grains in the steel. After quenching the steel down to a temperature below the temperature, depending on the composition of the steel, which results in martensitic transformation of the steel structure, it is again rapidly heated to 300°–600° C. by the same high-frequency induction heating, and then may be immediately rapidly cooled when a desired temperature in this range is attained. However, it is also acceptable to hold the steel at this latter temperature for up to 60 seconds before rapidly cooling it. Either method of heating and rapid cooling can accomplish the first object of the invention in producing the desired intermediate product, as has been confirmed by experiments to be described later.

When a carbon steel is rapidly heated by high-frequency induction, held in the austenitic range of less than 1000° C. for the shortest time that can be set depending on the chemical composition of the steel, and then quenched in water, the austenite grains of the steel become as fine as is specified by ASTM No. 9-12; and a structure with a microstructurally uneven concentration of carbon is developed, yielding in the hardening stage a steel of higher toughness than can be achieved by ordinary heat treatment. This is known in the art as a feature of a rapid-heat and quench method like high-frequency induction heating.

The present inventors have discovered that when a high strength steel of more than 0.3% by weight of carbon content thus hardened is, in the tempering stage (hereinafter referred to as "first stage tempering", to distinguish it from the tempering described later on), heated, preferably at a rate of greater than 100° C./second, to a desired temperature in the range of 300°–600° C., which is higher than the conventional tempering temperature, and is then immediately, or after a short time holding of up to 60 seconds, rapidly cooled, preferably at a rate of greater than 50° C./second, for example in water, a highly workable steel with a tensile strength of over 150 Kgf/mm² and high toughness can be obtained.

The mechanism by which this is accomplished is speculated to be such that rapid heating by high-frequency induction to a relatively high temperature (for first stage tempering), which contradicts the traditional notion of tempering, causes decomposition of martensite oversaturated with interstitial solid solution of atoms like carbon when said desired temperature, depending on the chemical composition of the steel, is attained, and also causes precipitation of carbide to take place faster than when the heating is slow; and this first stage tempering, followed immediately, or after a short holding time, by rapid cooling, supplies a thermal energy which is insufficient to yield a tempered state commonly considered satisfactory at said temperature to arrest the reactions taking place during an insufficiently tempered state in terms of the distribution and form of carbide.

The present inventors carried out various experiments before making this discovery. Some of the results are given here.

Experiment I

In this case, comparison is made with ordinary tempering by an electric furnace.

(1) Specimens:
SAE 1552 modified

| Chemical composition (wt. %): | | | | |
|---|---|---|---|---|
| C | Mn | Si | P | S |
| 0.51 | 1.56 | 0.24 | 0.017 | 0.006 |

Form and size:
Round wire (diameter of 12 mm)
Quenched hardness:
Hv = 800

(2) Tempering condition in relation to mechanical properties:

(a) In the case of high-frequency induction heating and tempering, and immediate rapid cooling without holding, when a desired temperature in the range of 300°–600° C. is attained, the mechanical properties are as shown in Table 1.

TABLE 1

| Tempering method | Tempering conditions | | Mechanical properties | | | |
|---|---|---|---|---|---|---|
| | Temperature (°C.) | Holding time (min.) | Hardness (Hv) | % Elongation (GL* = 8d) | Reduction of area (%) | Twist number (100d) |
| Electric furnace | 385 | 30 | 520 | 6.3 | 27.9 | 12 |
| Induction heating | 450 | 0 | 590 | 8.7 | 45.0 | 14 |
| | 500 | 0 | 535 | 9.7 | 50.2 | 16 |
| | 525 | 0 | 515 | 10.2 | 51.1 | 19 |
| | 550 | 0 | 480 | 11.4 | 52.3 | 23 |

*GL means "gauge length"

(b) In the case of high-frequency induction heating and tempering; and rapid cooling after holding, when a desired temperature in the range of 300°–600° C. is attained, the mechanical properties are as shown in Table 2.

TABLE 2

| Tempering method | Tempering conditions | | Mechanical properties | | | |
|---|---|---|---|---|---|---|
| | Temperature (°C.) | Holding time | Hardness (Hv) | % Elongation (GL = 8d) | Reduction of area (%) | Twist number (100d) |
| Electric furnace | 385 | 30 min. | 520 | 6.3 | 27.9 | 12 |
| Induction heating | 525 | 2 sec. | 510 | 10.8 | 53.0 | 19 |
| | 450 | 10 sec. | 550 | 9.0 | 49.0 | 15 |
| | 500 | 10 sec. | 515 | 10.1 | 51.4 | 17 |
| | 550 | 10 sec. | 470 | 11.5 | 55.9 | 25 |
| | 470 | 60 sec. | 515 | 9.7 | 50.3 | 16 |

(3) Experimental results:
According to the experimental results, a highly workable steel product can be obtained by rapidly heating the starting material steel by high-frequency induction, quenching it, rapidly heating it again to 300°–600° C. by the same heating method, and, when a desired temperature within this range is attained, which desired temperature depends on the chemical composition of the steel, rapidly cooling it immediately or after holding it for a very short time at said temperature.

Thus, as apparent from Tables 1 and 2, when compared in terms of elongation and reduction of area, the values obtained according to the present invention are far superior to those obtained by tempering in an electric furnace; particularly an increase in the twist number according to the present invention is as much as about two times that obtained with an electric furnace, thereby assuring high workability.

FIG. 1(a) illustrates the relation of the tempering time to the tempering temperature (for induction heating) for the specimens in this experiment, tempered in accordance with (2)(a) or (2)(b) above.

Figure 2A:
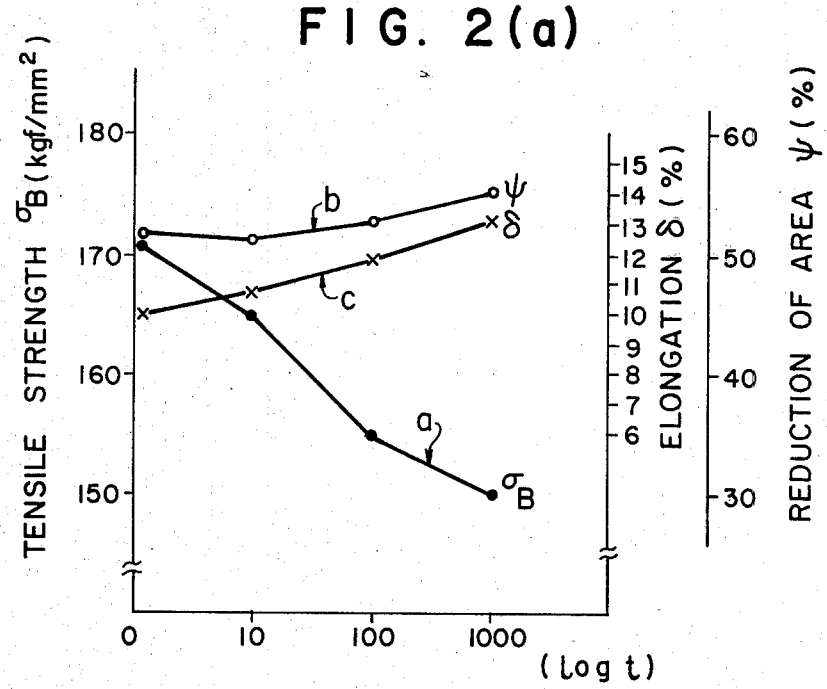
FIGS. 2(a), 2(b) and 3 each show certain mechanical properties of a test specimen which has been subjected to tempering and then cooling in accordance with an experiment to be described later. In these figures, the abscissa is the tempering time (logarithm log t), and curves a, b and c respectively represent tensile strength, reduction of area and elongation.

FIG. 2(a) illustrates the hardness and toughness of the steel obtained in (2)(a) above, when the steel was tempered at 525° C. and then immediately rapidly cooled without holding it at this temperature.

Figure 3:
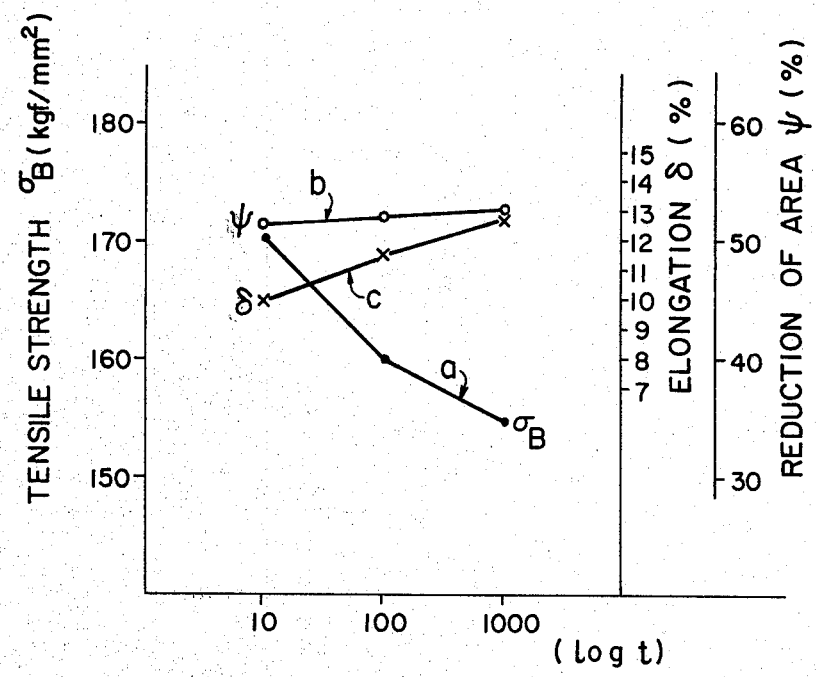

FIG. 3 illustrates the relation of the holding time to the hardness and toughness of the steel obtained in (2)(b) above, when the steel was tempered at 500° C. and held at this temperature for 10 seconds before being rapidly cooled.

Thus, as apparent from these experiments, when a carbon steel of about 0.5% by weight of carbon content is subjected to tempering according to the present invention, a steel characterized by a high strength, i.e. a strength of over 150 Kgf/mm², and excellent workability, can be obtained.

Figure 1B:
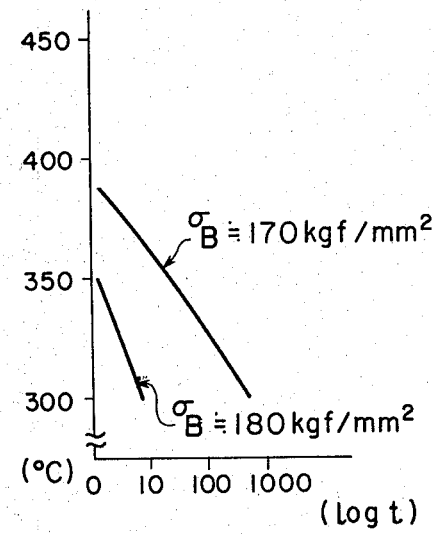
Figure 2B:
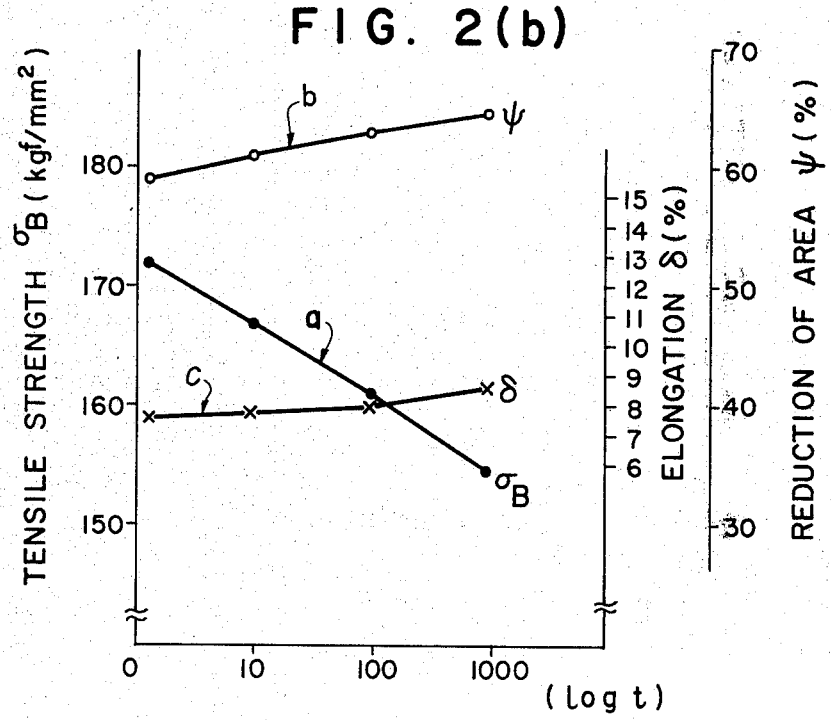

According to other experiments carried out by the present inventors, when a carbon steel containing over 0.3% by weight of carbon, as illustrated in Table 3, or a hardenable carbon steel containing an adequate content of more than one element from among Mn, Cr, Si and Mo, as illustrated in Tables 4–9, is subjected to the treatment described above according to the present invention, a steel equally characterized by a high strength of over 150 Kgf/mm² and excellent workability can be obtained. For instance, according to one such experiment when a steel whose chemical composition is as shown in Table 4 is subjected to treatment under the same conditions as above except that the tempering temperature is within the range as illustrated in FIG. 1(b), a steel having the mechanical properties illustrated in FIG. 2(b) can be obtained.

TABLE 3

(Values corresponding to Japanese Industrial Standard SWRH 62B)

| C(%) | Si(%) | Mn(%) | P(%) | S(%) |
|---|---|---|---|---|
| 0.59–0.66 | 0.15–0.35 | 0.60–0.90 | less than 0.040 | less than 0.040 |

TABLE 4

(S30C-Si)

| C(%) | Si(%) | Mn(%) | P(%) | S(%) | B(%) |
|---|---|---|---|---|---|
| 0.27–0.32 | 1.5–2.0 | 0.60–0.90 | less than 0.030 | less than 0.035 | 0.0015–0.0025 |

TABLE 5

(Values corresponding to SAE Standard SAE 9254 modified)

| C(%) | Si(%) | Mn(%) | P(%) | S(%) | Cr(%) | Mo(%) |
|---|---|---|---|---|---|---|
| 0.51–0.59 | 1.20–1.60 | 0.60–0.80 | less than 0.035 | less than 0.040 | 0.60–0.80 | 0.10–0.20 |

TABLE 6

(Values corresponding to Japanese Industrial Standards S 48 C modified)

| C(%) | Si(%) | Mn(%) | P(%) | S(%) | Cr(%) |
|---|---|---|---|---|---|
| 0.48 | 1.78 | 0.65 | 0.012 | 0.012 | 0.49 |

TABLE 7

(Values corresponding to SAE Standard SAE 1552 modified)

| C(%) | Si(%) | Mn(%) | P(%) | S(%) |
|---|---|---|---|---|
| 0.47–0.60 | 0.15–0.35 | 1.35–1.65 | less than 0.035 | less than 0.035 |

TABLE 8

(Values corresponding to Japanese Industrial Standard SUP-6 modified)

| C(%) | Si(%) | Mn(%) | P(%) | S(%) |
|---|---|---|---|---|
| 0.55–0.65 | 1.50–2.20 | 0.70–1.00 | less than 0.035 | less than 0.035 |

TABLE 9

(Values corresponding to Japanese Industrial Standard SUP-9 modified)

| C(%) | Si(%) | Mn(%) | P(%) | S(%) | Cr(%) |
|---|---|---|---|---|---|
| 0.50–0.60 | 0.15–0.35 | 0.65–1.00 | less than 0.035 | less than 0.035 | 0.65–1.00 |

The next step in the present invention is to cold plastic work the intermediate steel product obtained in the manner discussed above. Since, as stated above, the intermediate steel product obtained according to the process of the present invention has higher workability in spite of its higher tensile strength, it can be easily cold worked, for example into a coil spring of a diameter of 10–16 mm, which is about 50–60% larger than the conventional cold worked coil spring. In other words, a high-strength coil spring of large diameter (10–16 mm) obtained in the present invention can be easily cold worked by the conventional working machine. The same is true with a torsion bar, etc.

The present invention has the ultimate object of obtaining a final product having a high elastic limit, by reheating the cold worked product at 300°–500° C. for 30–60 minutes.

According to the present invention, in this second stage tempering (low-temperature tempering), in which the cold worked steel is heated to 300°–500° C., the cold worked product can be imparted with excellent anti-creep property, thereby yielding a final product which has a less permanent set. In other words, through the first stage tempering, characterized by rapid heating and quenching, a steel with an extremely high dislocation density maintained therein has its dislocations further increased as the result of cold plastic working; and through heating in the second stage tempering, which is usually done in an electric furnace at a temperature in the range of 300°–500° C. for 30–60 minutes, the carbides which have been decomposed and diffusively precipitated come to adhere to the dislocations, thereby elevating the elastic limit.

Meanwhile the insufficient precipitation, distribution and form of carbide as well as decomposition of martensite in the first stage tempering before the cold working of the steel come to be stabilized. Thus, it seems that ultimately a worked product characterized by high durability and anticreep property with retained high strength can be yielded.

Of course, the above-mentioned low-temperature tempering also gives the ordinary effect of removal of residual stress brought about by cold working, in addition to giving the above-mentioned effect.

The present inventors have carried out various tests on the above-mentioned stabilizing tempering treatment, and some of the results are given below.

Figure 4:
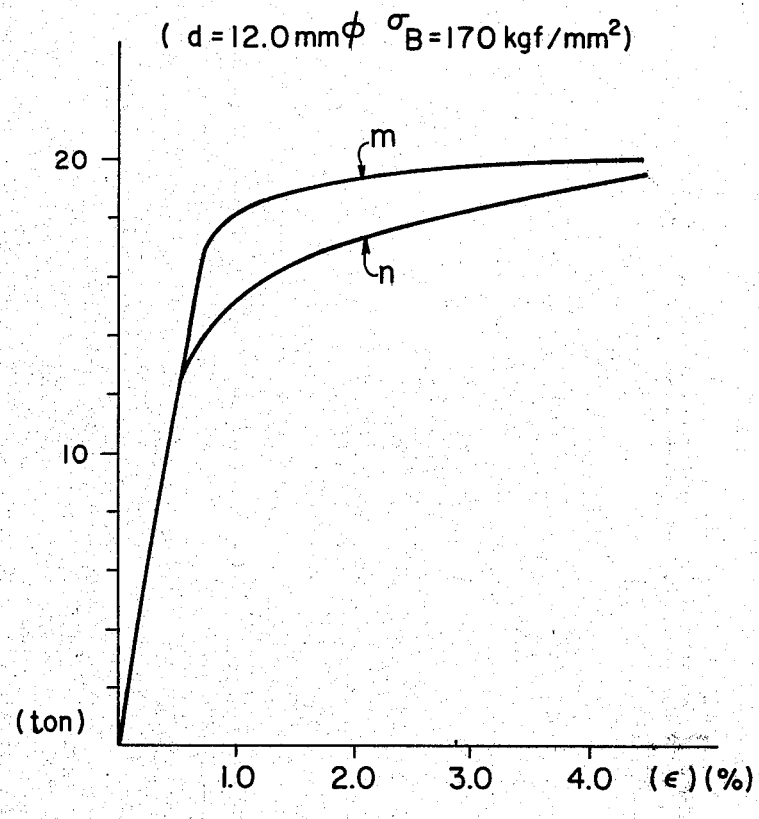
FIG. 4 shows a comparison of certain properties between a test specimen which has been cold plastic worked followed by tempering, and a specimen which has been tempered without first cold plastic working it.

Experiment II (1) Specimens:
  Same as in Experiment I
(2) Heat treating conditions:
  Same as in Experiment I
  Some of the specimens treated under the conditions (2) were plastic deformed by twisting (worked specimen), while others were not subjected to such deformation (non-worked specimen). Both specimens were subjected to a stabilizing tempering treatment under the same conditions, i.e., 350° C. for 30 minutes.
(3) Experimental results:
  The results turned out as shown in FIG. 4, in which the ordinate is the tension load, the abscissa is the strain ($\epsilon$), m is a tension-strain curve for the worked specimen and n is a tension-strain curve for the non-worked specimen. From FIG. 4, it is apparent that the worked specimen has a higher elastic limit and anti-creep property than the non-worked specimen.

Further, the present inventors conducted the following experiment on a coil spring for comparison of mechanical properties between the final product according to the present invention and the conventional hot worked product.

Experiment III (1) Specimens:
  Diameter: 14 mm

| Chemical composition: (Values corresponding to SAE Standard SAE 1552 modified) | | | | |
|---|---|---|---|---|
| C(%) | Mn(%) | Si(%) | P(%) | S(%) |
| 0.51 | 1.56 | 0.24 | 0.017 | 0.006 |

(2) Manufacturing steps:
  A. Present invention:
  (a) Rapid heating by high-frequency induction (temperature of 910° C.; holding time of 10 sec.)
  (b) Rapid quenching in water (water temperature of 28° C.)
  (c) First stage tempering by high-frequency induction (temperature of 525° C.)
  (d) Immediate rapid cooling in water (water temperature of 28° C.)
  (e) Cold working into a coil spring
  (f) Second stage tempering treatment (for stabilization) by heating in an electric furnace (temperature of 350° C.; holding time of 30 minutes)
  (g) Grinding both ends
  (h) Shot-peening
  (i) Pre-setting
  B. Conventional hot working:
  (a) Heating in an electric furnace (temperature of 880° C.; holding time of 15 minutes)
  (b) Hot working into a coil spring (temperature of 880°–855° C.)
  (c) Oil-quenching (oil temperature of 53° C.)
  (d) Tempering in an electric furnace (temperature of 400° C.; holding time of 30 minutes)
  (e) Rapid-cooling in water (water temperature of 28° C.)
  (f) Grinding both ends
  (g) Shot-peening
  (h) Pre-setting Some of the specimens (1) were subjected to the treatment A in (2), while others were subjected to the treatment B. The specimens were treated equally to a strength level of 170 Kgf/mm$^2$ and were worked into the following coil springs:

| | |
|---|---|
| D/d | 6 |
| wherein coil mean diameter D was 84 mm and wire diameter d was 14 mm. | |
| Effective number of turns Na | 5 |
| Total number of turns Nt | 7 |
| Free height H | 220 mm |

(3) Experimental procedure:
  All specimens were subjected to a constant-strain type fatigue testing machine to determine the fatigue limit of 2 million cycles.
(4) Experimental results:
  The results were as follows:

| | Fatigue limit of $2 \times 10^6$ cycles |
|---|---|
| Present invention: | $60 \pm 45$ Kgf/mm$^2$ |
| Conventional hot working: | $60 \pm 38$ Kgf/mm$^2$ |

The value of 60 represents the mean torsion stress and the values to the right of the ± sign represent the stress amplitude. Since the stress amplitude obtained in accordance with the present invention is greater than that obtained in accordance with conventional hot working, the present invention provides a more durable product.

The above are examples of using high-frequency induction heating as a means of rapid heating, but the same effect will be attained even when the current is passed directly through the steel for the purpose of heating it.

The first feature of the present invention lies in that, in the first stage of the process, in which a hardenable carbon steel containing an adequate content of more than one element from Mn, Cr, Si, Mo and, if desired, other elements, is rapidly heated by high-frequency induction, quenched, then rapidly heated to 300°–600° C. by high-frequency induction, and, when a desired temperature in this temperature range is attained, the steel is rapidly cooled immediately or after a very short holding time, the steel can be imparted with high strength and high workability, thereby yielding a high-strength steel with large diameter or thick wall which is easily cold workable by an ordinary working machine. The second feature of the invention lies in that, in the stabilizing low-temperature treatment of the second stage tempering after cold plastic working, a final product with a remarkably increased elastic limit can be obtained.

Thus, a steel of this kind, which conventionally has needed hot working, is now easily cold worked without the defects caused by hot working such as surface decarburization, reduced strength, strength variance, surface roughness and deformation; and a highly elastic steel product of high strength, durability and anti-creep property, not only with respect to a steel product having a small diameter or thin wall, but also with respect to a steel product having a large diameter or thick wall, can be obtained.

These effects are obtained with a torsion bar as well as with a coil spring. Namely, steel products which have so far been hot plastic workable are now cold plastic workable, and thereby the defects originating from hot plastic working can be eliminated.

Furthermore, with an additional effect of elevating the elastic limit in the second stage tempering, it is ultimately possible to obtain a product excelling in strength, durability and anti-creep property.

As seen from the above, the present invention applies to all hardenable steel intended for cold plastic working, or to be cold plastic worked in the manufacturing process.

We claim:

1. A process of preparing a coil spring, which comprises heating a steel wire, having a diameter of more than 10 mm, of a hardenable carbon steel containing at least 0.27% C, 0.15-2.2% Si and 0.60-1.65% Mn, by high-frequency induction at a rate of greater than 100° C./second to a temperature within the austenitic range for the hardenable carbon steel, quenching the thus heated steel wire, heating the quenched steel wire by high-frequency induction at a rate of greater than 100° C./second to between 300° and 600° C., stopping said heating, holding the steel wire for 10 to 60 seconds and then cooling the thus heated steel wire at a cooling rate of greater than 50° C./second to yield a cold plastic workable steel wire having a tensile strength of greater than 150 Kgf/mm$^2$, subjecting the cold plastic workable steel wire to cold plastic working to shape the wire into the form of a coil spring, and heating the resultant shaped wire to between 300° and 500° C. for from 30 to 60 minutes to temper said shaped wire and produce a coil spring product, with the proviso that the maximum temperature to which said shaped wire is heated is less than the maximum temperature to which said quenched steel is heated.

2. A process according to claim 1, wherein the hardenable carbon steel contains 1.20-1.78% Si, and further contains 0.49-1.00% Cr.

3. A process according to claim 1, wherein the hardenable carbon steel further contains 0.10-0.20% Mo.

4. A process according to claim 1, wherein the hardenable steel has a carbon content of more than 0.3% by weight.

5. A process according to claim 1, wherein the steel wire of the hardenable carbon steel is heated to a temperature within the range from just above the $A_3$ temperature to a maximum of about 1100° C.

6. A process according to claim 5, wherein the high-frequency induction heating of the steel wire of the hardenable carbon steel is carried out at a frequency of greater than 10 KHz.

7. A process according to claim 1, wherein the heating of the shaped wire to between 300° and 500° C. is carried out in an electric furnace.

* * * * *